United States Patent [19]
Thompson

[11] Patent Number: 6,119,182
[45] Date of Patent: Sep. 12, 2000

[54] SYSTEM FOR MODULAR STATE MACHINE WITH REDUCED CIRCUITRY DUE TO REDUCED LEVEL OF REPETITION OF THE SAME SEQUENCES OF STATES

[75] Inventor: Timothy D. Thompson, Windsor, Colo.

[73] Assignee: LSI Logic Corporation, Milpitas, Calif.

[21] Appl. No.: 09/052,713

[22] Filed: Mar. 31, 1998

[51] Int. Cl.[7] .................................................. G06F 13/00
[52] U.S. Cl. ........................... 710/100; 712/229; 326/37; 326/46
[58] Field of Search ........................ 712/229, 32, 208; 710/260, 100; 326/37, 46

[56] References Cited

U.S. PATENT DOCUMENTS

| | | | |
|---|---|---|---|
| 5,317,757 | 5/1994 | Medicke et al. | 395/800 |
| 5,329,471 | 7/1994 | Swoboda et al. | 364/578 |
| 5,386,583 | 1/1995 | Hendricks | 395/800 |
| 5,459,841 | 10/1995 | Flora-Holmquist et al. | 395/375 |
| 5,574,887 | 11/1996 | Fitch | 395/500 |
| 5,809,339 | 9/1998 | Hawkins et al. | 710/57 |
| 5,850,556 | 12/1998 | Grivna | 710/260 |
| 5,909,567 | 6/1999 | Novak et al. | 712/208 |
| 5,912,636 | 6/1999 | Gormish et al. | 341/50 |
| 5,913,043 | 6/1999 | Carter et al. | 710/100 |

*Primary Examiner*—Meng-Ai T. An
*Assistant Examiner*—Nabil El-Hady

[57] ABSTRACT

A modular state machine, and associated method permits reuse of modular portions of the state machine. Instead of duplicating identical groups of states of the state machine, jumps are provided to a modular portion of the state machine formed of a group of states. The circuit area required to implement the state machine is thereby reduced.

20 Claims, 4 Drawing Sheets

SYSTEM FOR MODULAR STATE MACHINE WITH REDUCED CIRCUITRY DUE TO REDUCED LEVEL OF REPETITION OF THE SAME SEQUENCES OF STATES

The present invention relates, in general, to a state machine used in the design and implementation of an electrical circuit. More particularly, the present invention relates to a modular state machine and an associated method, in which a modular portion of the state machine is reused at more than one location of the state machine.

By reusing a modular portion of the state machine at more than one location, the number of states required to form the state machine is reduced. Thereby, the circuitry, and corresponding circuit area, required to implement the state machine is reduced.

In one implementation, the modular state machine forms a portion of a bridge for interfacing between buses of a computer system, such as a bridge forming an interface between an ATA (advanced technology attachment) bus and a 1394 bus.

BACKGROUND OF THE INVENTION

In the development of electronic circuitry, state diagrams and corresponding state machines are sometimes utilized to describe and to implement logical functions.

By appropriate manipulation of logical functions described by the state diagram, a state machine implementation, using, e.g. logical gates, can be effectuated. The state machine so-formed is operably responsive to the application of input signals thereto to generate outputs corresponding to the logical functions which the state machine implements. Because the state machine implementation is a hardware implementation of a logical function, the state machine implementation permits the quick execution of the logical functions as well as providing, generally, circuitry of high reliability.

In some state machines, the same sequence of states is performed at different locations of the state machine. Particularly when the state machine implements a lengthy series of logical functions, the same sequence of states might need to be performed at a plurality of different locations of the state machine. For instance, in a state machine which implements a bridge interfacing computer buses of a computer system, a lengthy series of logical functions are typically required to be implemented. Groups of sequences of states are performed at different locations of the state machine.

In a conventional, sequential state machine, such same sequence of states are merely repetitiously repeated in the hardware construction of the state machine, and the resultant state machine merely sequences through the states, in conventional manner.

However, because of the repetition of the same state sequences, there is a duplication of circuitry at the locations of the state machine whereat the same sequences of states are repeated. If a manner could be provided by which to reduce the level of repetition of the same sequences of states of the state machine, the size of the circuitry required to implement the state machine could be reduced.

It is in light of this background information related to state machines that the significant improvements of the present invention have evolved.

SUMMARY OF THE INVENTION

The present invention, accordingly, advantageously provides a modular state machine, and an associated method, in which a modular portion of the state machine is reused at more than one location of the state machine.

When a common sequence of states is to be performed at more than one location of the state machine, a single modular portion, containing the common sequence of states, of the state machine is reused at more than one location of the state machine. Thereby, the circuitry, and corresponding circuit area, required to implement the state machine is reduced.

The state machine is constructed such that, at locations whereat a common sequence of states is to be performed, the next states associated with such locations identify the same initial state of a single sequence of the states. A register is utilized to identify the state to which to return at the completion of performance of the sequence of states.

Nesting of groups of sequences of states within other sequences of states is also possible. A series of registers, arranged in a register stack, e.g., in a LIFO (last-in, first-out) arrangement, permits a series of nested return states to be stored. The return states stored in the registers are accessed, thereby to identify the return state to which to return subsequent to execution of various levels of nested sequences of states.

In one implementation, the modular state machine forms a portion of a bridge for interfacing between buses of the computer system, such as a bridge forming an interface between an ATA (advanced technology attachment) bus and a 1394 bus.

In these and other aspects, therefore, a method, and associated apparatus, permits at least a first sequence module of a modular state machine to be reused at a first location and at least a second location of the modular state machine. The modular state machine has state machine states identifying a present state and a next state and a group of the state machine states form the first sequence module. A first-sequence-module next state is associated at the first location and at the at least the second location. The first-sequence-module next state identifies an initial state of the first sequence module. A first-sequence-module return state is associated with the first location and with the at least the second location. When execution of the state machine reaches one of the first location and the at least the second location, a jump is made to the initial state of the first sequence module identified by the first-sequence-module next state. The group of states forming the first sequence module is executed. And, subsequent to execution of the group of states forming the first sequence module, a jump is made to the first-sequence-module return state associated with the one of the first location and the at least the second location.

The present invention and the scope thereof can be obtained from the accompanying drawings which are briefly summarized below, the following detailed description of the presently-preferred embodiments of the invention, and the appended claims.

DETAILED DESCRIPTION

Figure 1A:
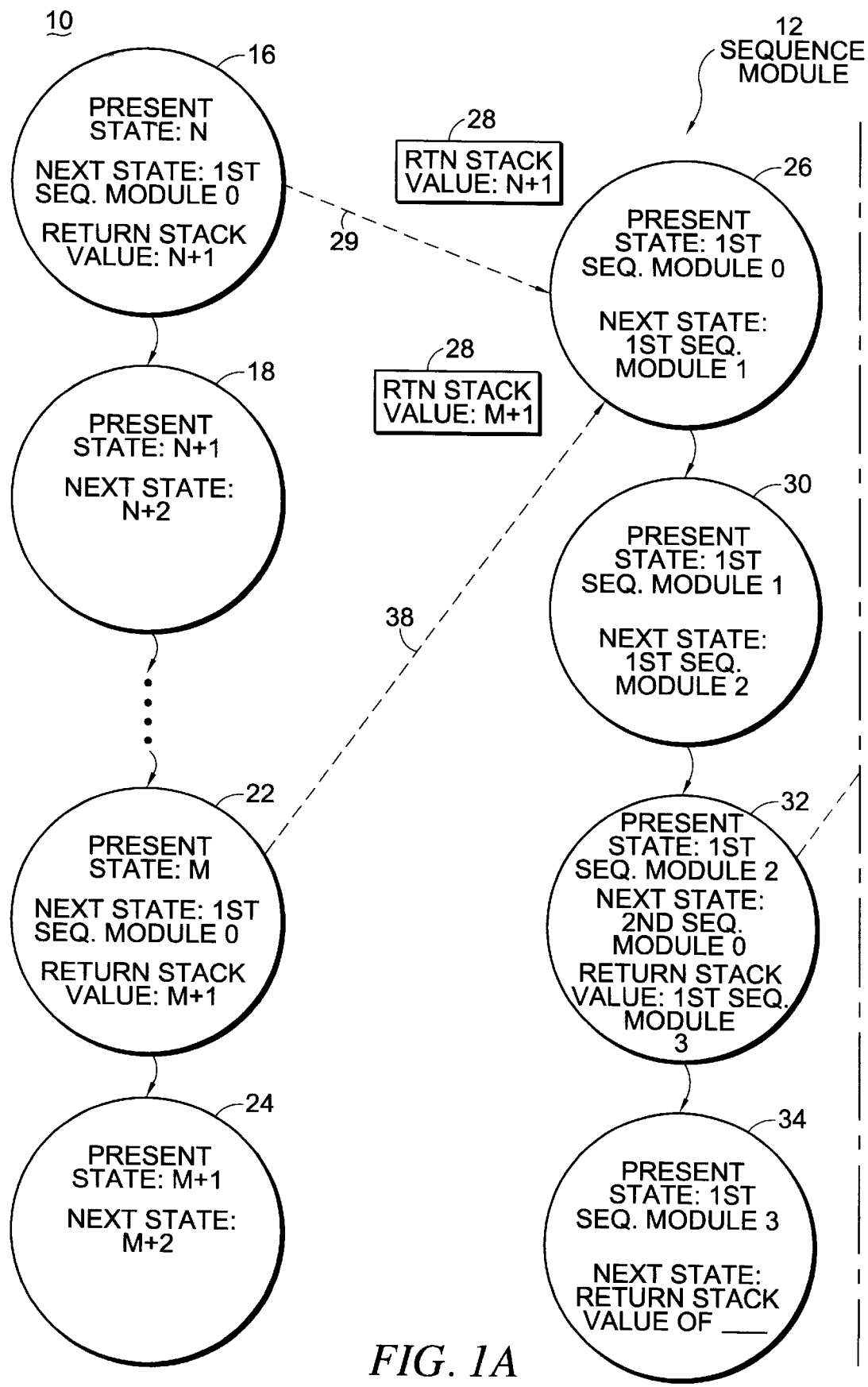
FIGS. 1A and 1B illustrate a modular state machine operable pursuant to an embodiment of the present invention.
Figure 1B:
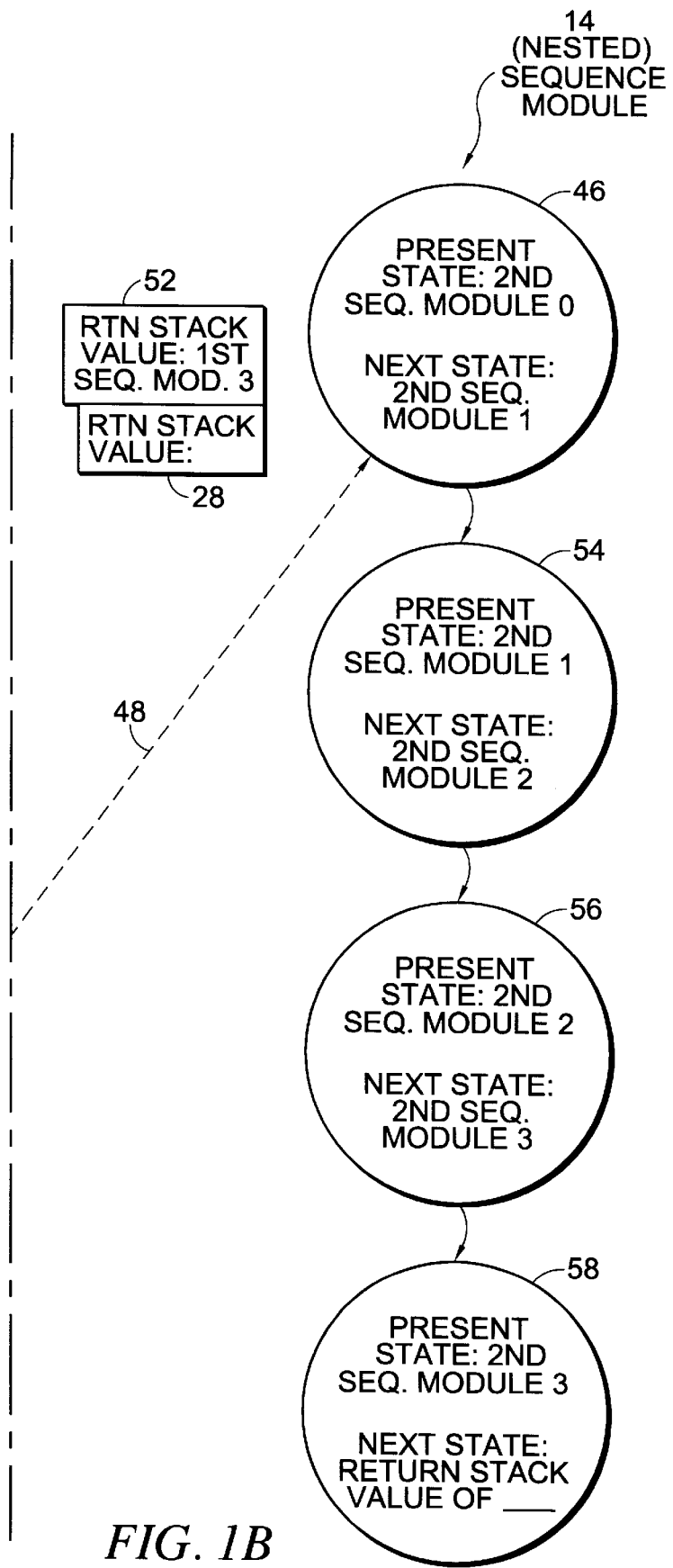

FIGS. 1A and 1B illustrate a state machine, shown generally at 10, of an embodiment of the present invention. The state machine 10 is formed of a plurality of sequential states which together define a logical function. In conventional manner, the state machine 10 is implemented in hardware logic, e.g., by logical gates, such as NAND gates or NOR gates and storage devices, such as flip flops.

The state machine 10 illustrated in the Figures is of simplified form to show various advantages and features of the present invention. An actual state machine 10, such as an exemplary implementation in which a state machine is used to form a bridge interface between buses of a computer system includes a fairly substantial number of states, for example, one hundred or more states.

For purposes of illustrating an embodiment of the present invention, the state machine 10 is here shown to include first and second sequence modules 12 and 14, respectively, each formed of groups of states. During operation of an embodiment of the present invention, jumps are made to the sequence modules 12 and 14 from any location of the state machine. Because jumps to the sequence modules, such as the modules 12 and 14 are permitted, hardware structure need not be implemented to provide the functions of the sequence module at each location that a sequential state machine otherwise would be required to have implemented. Instead, the hardware structure used to implement the functions of the sequence modules need be formed only once. When the function of a module is to be carried out, a jump is made thereto. Thereby, the circuitry required to implement the state machine 10 is reduced, and, when embodied in an integrated circuit, the area required of the circuit is correspondingly reduced.

The portion of the state machine 10 illustrated in the Figures further includes a plurality of states, here states, 16, 18, 22 and 24, each defining a present state and at least a next state. The state 16 is indicated to be of present state N; the state 18 is indicated to be of a present state N+1; the state 22 is indicated to be of a present state of M; and the state 24 is indicated to be of a present state M+1.

The first sequence module 12 is to be performed subsequent to the state 16. The next state of the state 16 is therefore indicated to be the identity of the first state, state 26, of the first sequence module 12. A return stack value, indicated by N+1, indicates to where a return should be made subsequent to completion of the steps of the first sequence module 12. The value N+1 is stored in a return stack register, here represented by the block 28. Upon completion of the state 16, a jump is made, indicated by the line 29, to the state 26 of the first sequence module.

The first sequence module 12 is shown to include, in addition to the state 26, states 30, 32, and 34. The present states of the states 26, 30, 32, and 34 forming the first sequence module 12 are indicated, respectively, to be the first sequence module state 0, the first sequence module state 1, the first sequence module state 2, and the first sequence module state 3. The next state of the state 34, the final state of the first sequence module 12, is indicated to be the return stack register 28 value, here N+1. So, upon completion of the state 34, a jump is made back to the state 18 having the present state value N+1.

Sequential states of the state machine 10 are completed through the state 22. The state 22 which also indicates the next state to be the initial state of the first sequence module 12. And, a return stack value of M+1 is also indicated at the state 22. Subsequent to the state 22, therefore, a jump, indicated by the line 38, shown in dash, is made to the initial state 26 of the first sequence module 12. The return stack value M+1 is stored in a return stack register, here also represented by the block 28.

The states of the first sequence module 12 are again carried out, and subsequent to the state 34, a jump is made back to the state M+1, here the state 24. Thereby, the circuitry associated with the first sequence module 12 need not be duplicated at more than one location. Instead, the circuitry associated with the first sequence module 12 is required to be formed only once; jumps are made to the sequence module, whenever needed, so that the steps of the sequence module 12 can be carried out.

Multi-step nesting of sequence modules is also permitted. Here, for purposes of illustration, the second sequence module 14 is nested within the first sequence module 12. In other embodiments, additional layers of nesting, as necessary, are provided.

As indicated, the state 32 has as its next state, the initial state, here the state 46, of the second sequence module 14. A return stack value of the third state, i.e., the state 34, of the first sequence module 12, is also indicated. When a jump, here indicated by the line 48, shown in dash, is made to the state 46 from the state 32, the return stack value is stored in the return stack register, here the register 52. Because of the nested arrangement of the sequence modules, the registers 28 and 52, form a stack in an LIFO arrangement.

Once the jump is made to the second sequence module 14, the states of the sequence module, here the states 46, 54, 56, and 58 are sequentially carried out. From the state 58, a jump is made back to the state indicated in the return stack register 52, here to the state 34. While not separately illustrated, jumps can be made to the second sequence module 14 from other locations of the state machine 10, viz., from other than the state 32 illustrated in the exemplary illustration of the Figure.

Figure 2:
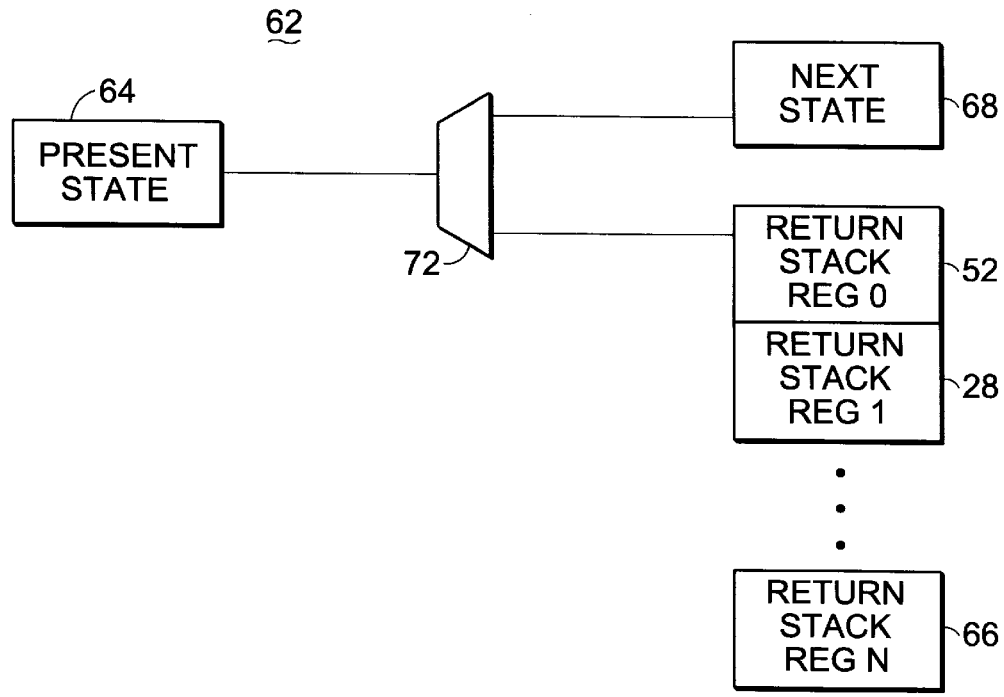
FIG. 2 illustrates a functional block diagram representing the relationship between a present state of a state of the state machine shown in FIGS. 1A and 1B and selection of next state values when jumps are made to sequence modules.

FIG. 2 illustrates circuitry shown generally at 62, showing the relationship between the present state, here indicated by 64, of any of the states of the state machine 10. Return stack registers, including the return stack registers 52 and 28, shown previously in FIGS. 1A and 1B, are again shown. A return stack register N, identified at 66, is also illustrated in the Figure to represent the multiple nesting capability of operation of an embodiment of the present invention. That is to say, while only a first level of nesting is illustrated in the state machine 10 shown in FIGS. 1A and 1B, additional nesting, here N levels of nesting, are provided by increasing the stack depth of the return stack registers.

A next state, indicated by 68, is also indicated. The state 68 is representative of a sequential next state of the states of the state machine. A multiplexor 72 is indicated to select either a next state 68 or a state indicated in a register of the return stack to form a subsequent present state 64 state of the state machine. Storage of the return stack values in the respective registers, such as the registers 52 and 28, permit returns to appropriate states of the state machine subsequent to the completion of a sequence module of the state machine. Stacking of the registers also permits nesting of sequence modules within other sequence modules. Thereby, circuitry required to implement a state machine can be reduced.

Figure 3:
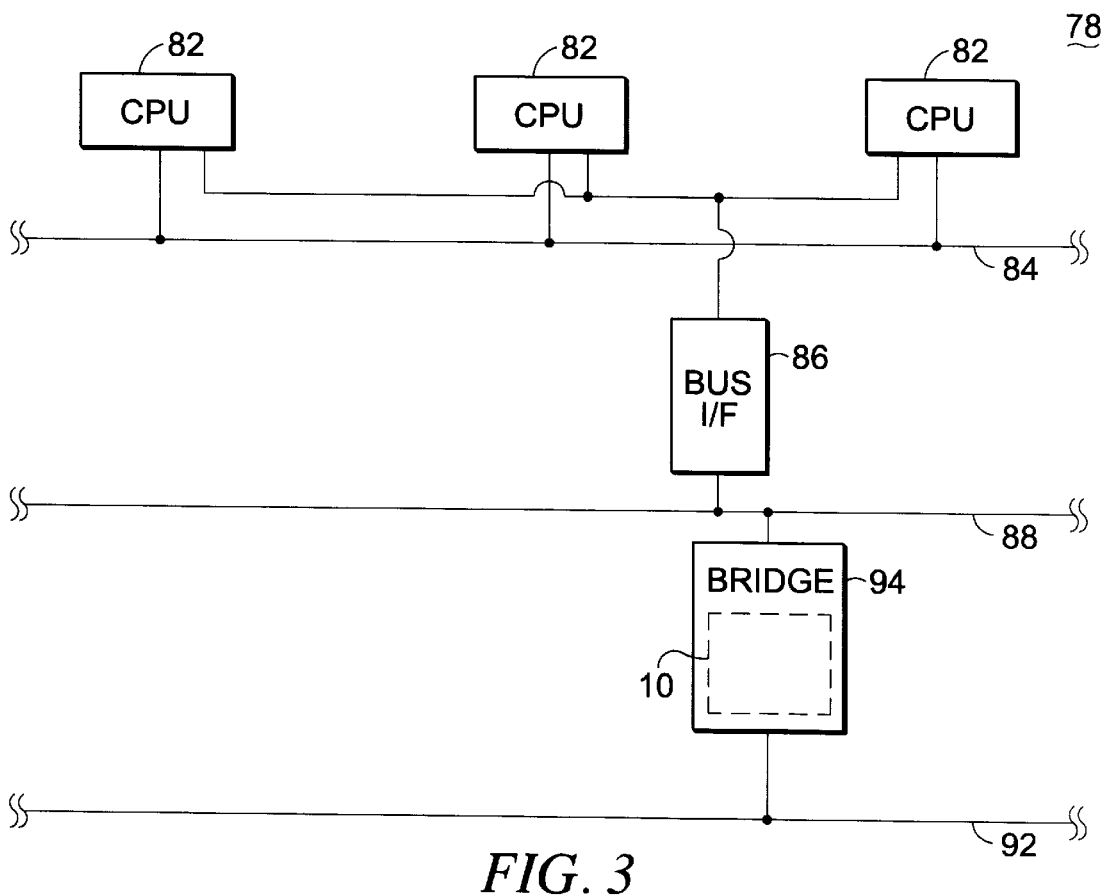
FIG. 3 illustrates a functional block diagram of a portion of a computer system, here showing a bridge circuit of a computer system in which a state machine operable pursuant to an embodiment of the present invention forms a portion.

FIG. 3 illustrates a computer system, shown generally at 78, in which an embodiment of the present invention is operable. The computer system 78 is here shown to include a plurality of CPUs (central processor units) 82 connected together by way of a processor bus 84. A bus interface 86 connects the CPUs 82 with a peripheral bus, here a 1394 bus 88.

The computer system 78 further includes an additional peripheral bus, here an ATA bus 92 which is coupled to the 1394 bus 88 by way of a bridge 94. The bridge includes a state machine 10 constructed according to an embodiment of the present invention. Peripheral devices coupled to the respective buses 88 and 92, for purposes of simplicity, are not shown. Because the state machine 10 is modular in nature, the circuitry required to implement the state machine is reduced as modular portions of the state machine can be accessed by jumping thereto. The conventional requirement to duplicate redundant sequential portions of the state machine is thereby obviated.

Figure 4:
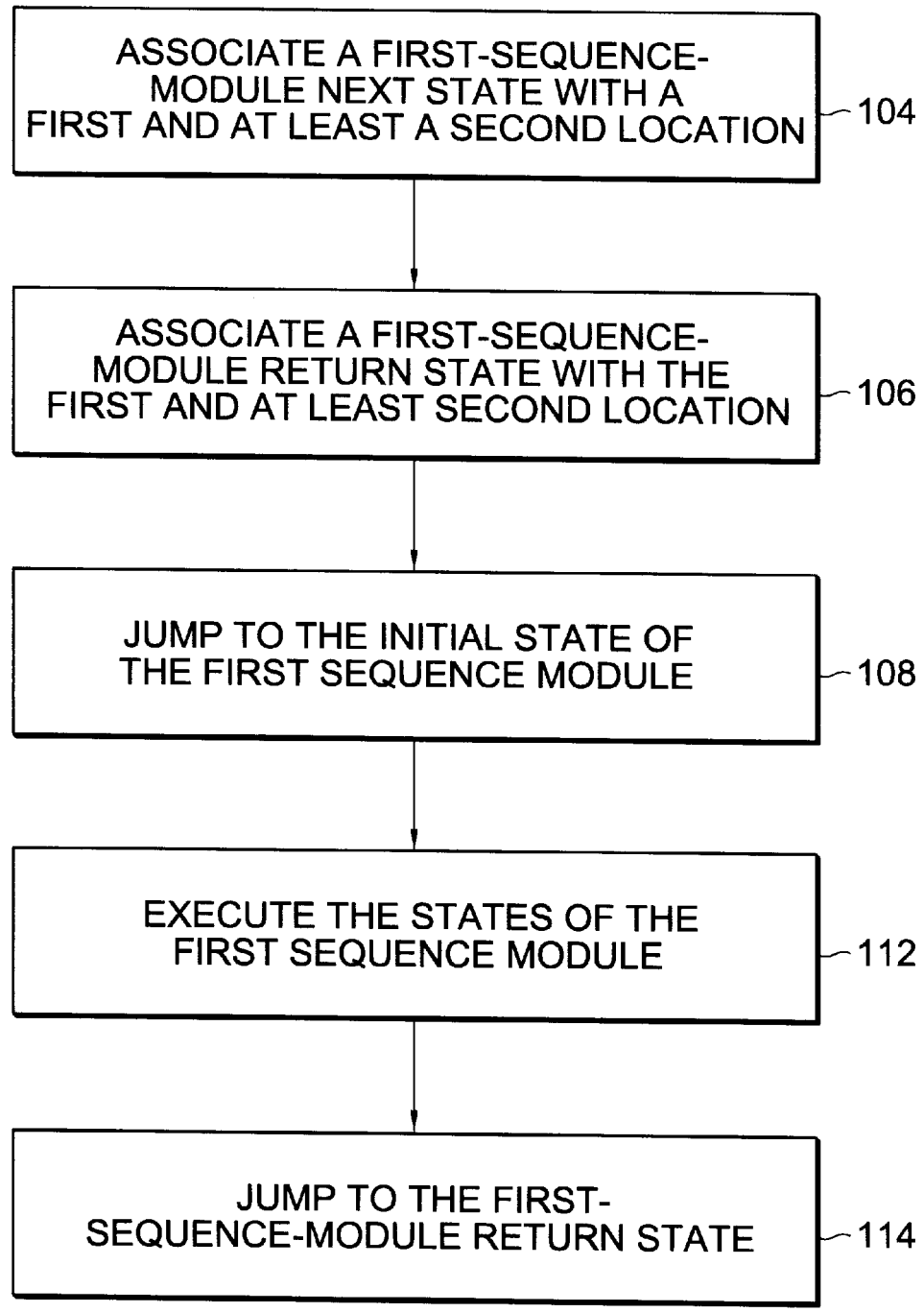
FIG. 4 illustrates a method flow diagram listing the method steps of the method of an embodiment of the present invention.

FIG. 4 illustrates a method, shown generally at 102, of an embodiment of the present invention. The method 102 reuses at least a first sequence module of a modular state machine. The sequence module is to be executed at both a first location and at least a second location of the state machine. A group of states form the first sequence module.

First, and as indicated by the block 104, a first-sequence-module next state is associated at the first location and at the at least the second location of the state machine. The first-sequence-module next state identifies an initial state of the first sequence module. Next, and as indicated by the block 106, a first-sequence-module return state is associated with the first location and with the at least the second location. When execution of the state machine reaches one of the first location and the at least the second location, and as indicated by the block 108, a jump is made to the initial state of the first sequence module, identified by the first-sequence-module next state. Then, and as indicated by the block 112, the group of states forming the first sequence module is executed.

Subsequent to the execution of the first sequence module, and as indicated by the block 114, a jump is made to the first-sequence-module return state associated with the one of the first location and the at least the second location.

Operation of an embodiment of the present invention thereby permits a modular portion of a state machine to be reused at more than one location. Because such reuse is possible, the number of states required to form the state machine is reduced. And, the circuitry, and corresponding circuit area required to implement the state machine, is correspondingly reduced.

The previous descriptions are of preferred examples for implementing the invention, and the scope of the invention should not necessarily be limited by this description. The scope of the present invention is defined by the following claims.

I claim:

1. A method for reusing at least a first sequence module of a modular state machine, to be executed at a first location and at least a second location of the modular state machine, the modular state machine having state machine states identifying a present state and a next state, a group of the state machine states forming the first sequence module, said method comprising the steps of:

associating a first-sequence-module next state at the first location and at the at least the second location, the first-sequence-module next state identifying an initial state of the first sequence module;

associating a first-sequence-module return state with the first location and with the at least the second location;

when execution of the state machine reaches one of the first location and the at least the second location, jumping to the initial state of the first sequence module identified by the first-sequence-module next state during said step of associating the first-sequence-module next state;

executing the group of states forming the first sequence module; and subsequent to execution of the group of states forming the first sequence module during said step of executing, jumping to the first-sequence-module return state associated, during said step of associating the first-sequence-module return state, with the one of the first location and the at least the second location.

2. The method of claim 1 comprising the additional step, prior to said step of jumping to the initial state of the first sequence module, of storing the first-sequence-module return state associated with the one of the first location and the at least second location reached during execution of the state machine in a first-sequence-module register.

3. The method of claim 2 comprising the additional step, prior to said step of jumping to the first-sequence-module return state, of accessing the first-sequence-module return state stored in the first-sequence-module register.

4. The method of claim 3 wherein said step of jumping to the first-sequence-module return state comprises jumping to the first-sequence-module return state accessed during said step of accessing.

5. The method of claim 1 wherein the at least the first sequence module further comprises a second sequence module to be executed at a third location of the modular state machine, said method comprising the additional steps of:

associating a second-sequence-module next state with the third location, the second-sequence-module next state identifying an initial state of the second sequence module; and associating a second-sequence module return state with the third location.

6. The method of claim 5 comprising the additional steps when execution of the state machine reaches the third location of jumping to the initial state of the second sequence module; and executing the second sequence module.

7. The method of claim 6 comprising the additional step, subsequent to said step of executing the second sequence module, of jumping to the second-sequence-module return state associated, during said step of associating the second-sequence-module return state, with the third location.

8. The method of claim 5 wherein the third location comprises a state of the first-sequence-module.

9. In a state machine having state machine states, each state machine state identifying a present state and a next state, the state machine states including at least one sequence of state machine states forming at least a first sequence module executed at a first location and at least a second location of the state machine, an improvement of apparatus for reusing the first sequence module at both the first location and the at least the second location of the state machine, said apparatus comprising;

a first-sequence-module next state associated with the first location and the at least the second location at which the first sequence is executed, said first-sequence-module next state identifying an initial state of the first sequence module;

a first-sequence-module return state associated with the first location and with the at least the second location at which the first sequence module is executed, said first-sequence-module return states associated with the first and at least second locations, respectively, identifying states of the state machine to which to return subsequent to execution of the first sequence module; and a first-sequence-module register for storing a return state of said first-sequence-module return states when said next state identifies the initial state of the first sequence module, said register accessible subsequent to execution of the first sequence module to identify a state of the state machine to which to return subsequent to execution of the first sequence module.

10. The apparatus of claim 9 wherein the at least the first sequence module formed by the state machine further comprises a second sequence module executed at a third location and at least a fourth location of the state machine, said apparatus further for reusing the second sequence module at both the third location and the at least the fourth location, said apparatus further comprising:

a second-sequence-module next state associated with the third location and the at least the fourth location at which the second sequence module is executed, said second-sequence-module next state identifying an initial state of the second sequence module.

11. The apparatus of claim 10 further comprising:

a second-sequence-module return state associated with the third location and with the at least the fourth location, said second-sequence-module return states identifying states of the state machine to which to return subsequent to execution of the second sequence module.

12. The apparatus of claim 11 further comprising:

a second-sequence-module register for storing a return state of said second-sequence-module return states when said second-sequence-module next state identifies the initial state of the second sequence module, said second-sequence-module register accessible subsequent to execution of the second sequence module to identify a state of the state machine to which to return subsequent to execution of the second sequence module.

13. The apparatus of claim 12 wherein at least one of the third location and the fourth location comprises a state of the first sequence module.

14. The apparatus of claim 13 wherein said first-sequence-module register and said second-sequence-module register together form a register stack.

15. The apparatus of claim 14 wherein said register stack forms a LIFO (last-in, first-out) register stack.

16. The apparatus of claim 9 wherein the state machine comprises a bus interface between a first bus and a second bus of a computer system, wherein the first-sequence-module is executed pursuant to interface of data communications between the first bus and the second bus, and wherein said first-sequence-module next state identifies an initial state of the first-sequence-module executed pursuant to the interface of the data communications between the first bus and the second bus.

17. A method of executing a modular state machine circuit having a plurality of state machine states identifying a present state of the modular state machine circuit, the method comprising:

associating a first state machine state with a next state value identifying a second state machine state and a return state value identifying a third state machine state;

designating the first state machine state as the present state so as to execute circuit logic associated with the first state machine state;

storing the return state value of the first state machine state to a return state register;

inputting contents of the return state register to a selector circuit;

inputting the next state value of the first state machine state to the selector circuit;

selecting the selector circuit to output the next state value to designate the second state machine state as the present state, so as to execute circuit logic associated with the second state machine state.

18. The method of claim 17 further comprising:

associating a fourth state machine state with a next state value identifying a return condition;

designating the fourth state machine state as the present state so as to execute circuit logic associated with the fourth state machine state;

inputting contents of the return state register to the selector circuit;

inputting the next state value of the fourth state machine state to the selector circuit;

selecting the selector circuit, based on the return condition identified by the next state value of the fourth state machine state, to output contents of the return state register to designate the third state machine state as the present state, so as to execute circuit logic associated with the third state machine state.

19. The method of claim 18 wherein the second and fourth state machine states are included in a first sequence module, and further comprising:

forming a return state register stack including the return state register that is capable of storing a plurality of return state values;

providing a second sequence module including a sixth state machine state associated with a next state value identifying the return condition;

pushing a return state value associated with a state of the first sequence module on the return state register stack;

jumping from execution of the first sequence module to the second sequence module in a nested execution flow;

inputting contents of the return state register stack to the selector circuit;

inputting the next state value of the sixth state machine state to the selector circuit; and selecting the selector circuit, based on the return condition identified by the next state value of the sixth state machine state, to output contents of the return state register stack to designate a seventh state machine state, so as to execute circuit logic associated with the seventh state machine state.

20. A method for executing at least a first sequence module of a modular state machine at one of a first location and at least a second location of the modular state machine, the modular state machine having state machine states identifying a present state and a next state, a group of the state machine states forming the first sequence module, the method comprising the steps of:

associating a next state with each of the first location and at the at least the second location, each next state identifying an initial state of the first sequence module;

associating a return state with each of the first location and the at least the second location, a first return state with the first location and a second return state with the at least the second location;

inputting one of the return states and the next state to a selector circuit;

when execution of the modular state machine reaches one of the first location and the at least the second location, outputting the next state from the selector circuit to define the present state of the modular state machine to be the initial state of the first sequence module;

executing the group of states forming the first sequence module to reach a terminal state of the first sequence module;

associating a terminal next state with the terminal state, the terminal next state indicating a return condition;

causing the selector circuit to select for output, based on the terminal next state, the return state associated with the one of the first location and the at least second location reached during execution of the modular state machine; and subsequent to execution of the group of states forming the first sequence module during said step of executing, outputting from the selector circuit the return state to define the present state of the modular state machine to be the return state.

* * * * *